United States Patent [19]

Kimura

[11] 4,251,158
[45] Feb. 17, 1981

[54] ALBADA FINDER INCORPORATING A RANGE FINDER
[75] Inventor: Tadashi Kimura, Tokyo, Japan
[73] Assignee: Olympus Optical Co., Ltd., Tokyo, Japan
[21] Appl. No.: 17,719
[22] Filed: Mar. 5, 1979
[30] Foreign Application Priority Data
Mar. 16, 1978 [JP] Japan .................. 53/33879[U]
[51] Int. Cl.³ .................................. G01C 3/04
[52] U.S. Cl. ........................ 356/8; 354/166; 354/224
[58] Field of Search ............. 356/8; 354/166, 219, 354/224, 225

[56] References Cited
U.S. PATENT DOCUMENTS
2,210,191  8/1940  Tronnier ..................... 356/8
3,125,623  3/1964  Leitz et al. ................. 354/166 X

FOREIGN PATENT DOCUMENTS 34-258    1/1959  Japan .
35-1151   1/1960  Japan .
35-3965   3/1960  Japan .
36-12867  5/1961  Japan .
37-16933  10/1962 Japan .
39-15564  6/1964  Japan .
41-18462  10/1966 Japan .
45-12826  5/1970  Japan .

Primary Examiner—F. L. Evans
Attorney, Agent, or Firm—Cushman, Darby & Cushman

[57] ABSTRACT

An albada finder incorporating a range finder comprising a first negative lens component, a second thick negative lens component and a third positive lens component, said second lens component being split into two elements along a plane inclined with regard to the optical axis and a semitransparent surface being formed on said split surface.

2 Claims, 4 Drawing Figures

ALBADA FINDER INCORPORATING A RANGE FINDER

BACKGROUND OF THE INVENTION (a) Field of the Invention:

The present invention relates to an albada finder, and more specifically to a super-compact finder incorporating a range finder for use with compact cameras.

(b) Description of the Prior Art:

As is already known to those skilled in the art, an albada finder comprises a first concave lens component, a second concave lens component and a third convex lens component as well as a field mask formed on said convex lens component and a reflecting surface formed on the concave surface of said concave lens component to reflect the rays coming from said field mask, whereby an image of said field mask is formed within the visual field of the albada finder with the rays coming from said field mask and reflected on said reflecting surface. In order to incorporate such an albada finder with a range finder, there have conventionally been available two methods. One method is to arrange a half mirror between the first and second lens component for reflecting the rays coming from the range finder lens system toward the eyepiece of the albada finder. The other method is to arrange a half mirror between the second and third lens component for the same purpose. Of these two methods, the former has a defect that the albada finder is designed unavoidably as a large lens system since the rays pass through higher portions of the first and second lens component, thereby making it necessary to reserve a wide space between the first and second lens component.

The latter method also has a defect that the image of the field mask is unavoidably darkened though it allows the rays to pass through lower portions of the second and third lens components, thereby requiring no wide space between these two lenses.

SUMMARY OF THE INVENTION

A general object of the present invention is to provides a compact albada finder incorporating a range finder which comprises a lens system consisting of a first concave lens component, a second concave lens component and a third lens component and in which said second lens component is thick and split along a plane inclined with regard to the optical axis, and the split surface is made semitransparent so as to lead the rays coming from the ranger finder lens system into the albada finder lens system.

DESCRIPTION OF THE PREFERRED EMBODIMENTS

Referring now to the accompanying drawings, a preferred embodiment of the albada finder according to the present invention will be described in more details.

Figure 1:
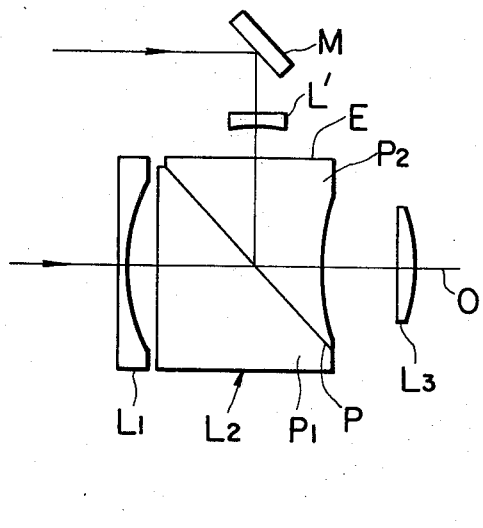
FIG. 1 shows a sectional view illustrating the composition of the albada finder incorporating a range finder according to the present invention.

In FIG. 1, the reference symbols $L_1$, $L_2$ and $L_3$ represent a concave lens component, a thick concave lens component and a convex lens component respectively which composes an albada finder lens system. The reference symbol M designates a reflecting mirror and the reference symbol L' denote a lens system composing a ranger finder. In this albada finder lens system, the lens component $L_2$ is thick and split into two pieces, as illustrated, along a plane P which is inclined with regard to the optical axis O of the albada finder lens system. This split surface P is made semitransparent so as to overlap the rays having passed through the albada finder lens system with those which have passed through the range finder lens system. In other words, the lens component $L_2$ is composed by bonding two prisms $P_1$ and $P_2$, making the bonded surface semitransparent and forming a concave surface on one side of the prism $P_2$ so that it has a function of a concave lens element. Such a composition makes it possible to obtain substantially the same effect as that available with an albada finder incorporating a range finder which comprises a half mirror arranged in a wide space reserved between the first and second lens component, and to design an albada finder incorporating a range finder and having a short total length.

In the lens system of the albada finder incorporating a range finder according to the present invention, the second lens component should preferably have thickness within the range defined by the formula shown below:

$$\frac{2a^2}{\sqrt{r_4^2 - a^2}} < d_3 \leq (2a - r_4) + \sqrt{r_4^2 - a^2}$$

wherein the reference symbol a represents height of ray which is dependent on field ratio, angle of field of photographic lens and magnification of the finder, whereas the reference symbol $r_4$ designates radius of curvature on the eyepiece side surface of the second lens component.

Figure 2:
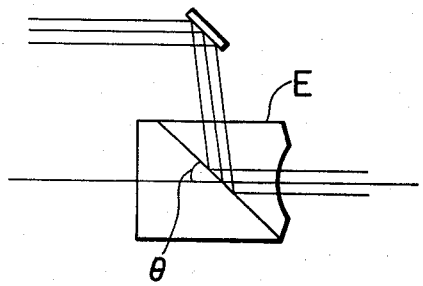
FIG. 2 and FIG. 3 show sectional views illustrating the interrelation between inclination of the semitransparent surface formed within the second lens component and angle of incidence of the rays coming from the range finder lens system.

The upper limit defined by the above-mentioned condition is required for designing a compact albada finder. When inclination angle $\theta$ of the semitransparent mirror surface is small as shown in FIG. 2, it is required to enlarge the mirror M correspondingly in the range finder lens system. Since this mirror is rotated for focusing, a large mirror is disadvantageous and unpreferable for precise mirror rotation. Therefore, it is not preferable to select angle $\theta$ formed between the semitransparent surface and the optical axis within a range smaller than 45°. The upper limit of the above-mentioned condition is determined so as to make the second lens component have a value of $d_3$ as small as possible taking the lower limit of the inclination angle of the semitransparent surface as 45°.

Figure 3:
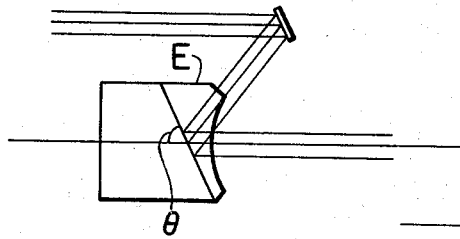

It is desirable to minimize value of $d_3$ for designing a compact albada finder. When value of $d_3$ is too small, however, inclination angle $\theta$ of the half mirror will unavoidably be enlarged as illustrated in FIG. 3. If the inclination angle is so large, rays coming from the range finder lens system will deviate from the surface of incidence E. It is therefore necessary to select value of $d_3$ within such a range that the rays coming from the range finder lens system will not deviate from the surface of incidence.

The lower limit of the above-mentioned condition is determined as a threshold to make the rays coming from the range finder lens system fall on the surface of incidence.

Though the semitransparent surface may be formed over the entire range of the split surface, it is possible to prevent brightness from being lowered in the visual field by forming the semitransparent surface only at the central portion of the split surface on which the rays from the the range finder lens system are incident.

Now, numerical data of a preferred embodiment of the present invention will be shown below:

Embodiment
$r_1 = \infty$
$d_1 = 0.162$  $n_1 = 1.48749$  $\nu_1 = 70.15$
$r_2 = 2.577$
$d_2 = 0.324$
$r_3 = \infty$
$d_3 = 1.553$  $n_2 = 1.48749$  $\nu_2 = 70.15$
$r_4 = 6.636$
$d_4 = 1.812$
$r_5 = \infty$
$d_5 = 0.176$  $n_3 = 1.48749$  $\nu_3 = 70.15$
$r_6 = -3.230$
$d_6 = 0.162$
$r_7 = \infty$
$d_7 = 0.809$  $n_4 = 1.52287$  $\nu_4 = 59.9$
$r_8 = 2.703$
$f = -100$  Field ratio: 95%

Magnification of the finder: 0.55X
Field angle of photographic lens $2\omega = 64°$
Height of ray in the second lens component: 1.104
wherein the reference symbols $r_1$ through $r_8$ represent radii of curvature on the surfaces of the respective lens component used in the albada finder lens system, the reference symbols $d_1$ through $d_7$ designate thicknesses of the respective lens component arranged in the albada finder lens system and airspaces therebetween and the reference symbol f denotes focal length of the albada finder lens system.

Figure 4:
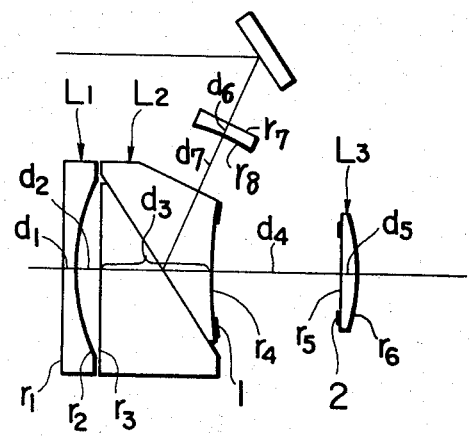
FIG. 4 shows a sectional view illustrating the composition of an embodiment of the present invention.

This embodiment has such a composition as shown in FIG. 4 wherein the reference numeral 1 represents a surface for reflecting the rays coming from the field mask and the reference numeral 2 designates a field mask.

I claim:

1. An albada finder incorporating a range finder comprising a first negative lens component, a second thick negative lens component consisting of two elements which are split along a plane inclined with regard to the optical axis, a third positive lens component, a field mask formed on the surface of said third lens component, a reflecting mirror mounted on the surface of said second lens component and serving to reflect the rays coming from said field mask and a semitransparent surface formed on the inclined surface of said second lens component.

2. An albada finder incorporating a range finder according to claim 1 wherein thickness $d_3$ of said second lens component satisfies the following condition:

$$\frac{2a^2}{\sqrt{r_4^2 - a^2}} < d_3 \leq (2a - r_4) + \sqrt{r_4^2 - a^2}$$

wherein the reference symbol a represents height of the field ray and the reference symbol $r_4$ designates radius of curvature on the surface on the eyepiece lens of said second lens component.

* * * * *